(12) United States Patent
Sasamoto et al.

(10) Patent No.: US 11,029,150 B2
(45) Date of Patent: Jun. 8, 2021

(54) OBJECT DISTANCE DETECTION DEVICE

(71) Applicant: Hitachi Automotive Systems, Ltd., Hitachinaka (JP)

(72) Inventors: Manabu Sasamoto, Tokyo (JP); Shinichi Nonaka, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 55 days.

(21) Appl. No.: 16/097,366

(22) PCT Filed: May 31, 2017

(86) PCT No.: PCT/JP2017/020197
§ 371 (c)(1),
(2) Date: Oct. 29, 2018

(87) PCT Pub. No.: WO2017/212992
PCT Pub. Date: Dec. 14, 2017

(65) Prior Publication Data
US 2019/0145768 A1 May 16, 2019

(30) Foreign Application Priority Data
Jun. 8, 2016 (JP) .............................. JP2016-113995

(51) Int. Cl.
*G01C 3/14* (2006.01)
*G01C 3/06* (2006.01)
(Continued)

(52) U.S. Cl.
CPC ................ *G01C 3/14* (2013.01); *G01C 3/06* (2013.01); *G01C 3/085* (2013.01);
(Continued)

(58) Field of Classification Search
CPC . G01C 3/06; G01C 3/085; G01C 3/14; G06K 9/00798; G06K 9/00805;
(Continued)

(56) References Cited

U.S. PATENT DOCUMENTS 7,092,015 B1  8/2006 Sogawa
8,743,202 B2  6/2014 Schick et al.
(Continued)

FOREIGN PATENT DOCUMENTS

EP    2 863 358 A1   4/2015
JP    2001-92968 A   4/2001
(Continued)

OTHER PUBLICATIONS

Extended European Search Report issued in European Application No. 17810171.3 dated Jan. 24, 2020 (11 pages).
(Continued)

*Primary Examiner* — Mekonen T Bekele
(74) *Attorney, Agent, or Firm* — Crowell & Moring LLP (57) ABSTRACT

The purpose of the present invention is to provide an imaging device capable of both improving object detection accuracy and reducing calculation load. The present invention comprises: a plurality of imaging units; an object information acquisition unit that obtains object information including distance information for objects; a search conditions setting unit that sets conditions for searching for image elements corresponding to specific image elements inside a standard image captured by one of the plurality of imaging units, same being searched for inside a reference image captured by another imaging unit; and a stereo distance detection unit that performs said search on the basis of conditions set by the search conditions setting unit and detects the object distance on the basis of parallax obtained by the search. The search conditions setting unit sets the
(Continued)

search range for searches, on the basis of the detection information for the object.

8 Claims, 8 Drawing Sheets

(51) Int. Cl.
  *G06T 1/00* (2006.01)
  *G06T 7/60* (2017.01)
  *G06T 7/593* (2017.01)
  *G01C 3/08* (2006.01)
  *G06K 9/00* (2006.01)
  *B60Q 9/00* (2006.01)
(52) U.S. Cl.
  CPC ..... *G06K 9/00798* (2013.01); *G06K 9/00805* (2013.01); *G06K 9/00825* (2013.01); *G06T 1/00* (2013.01); *G06T 7/593* (2017.01); *G06T 7/60* (2013.01); *B60Q 9/008* (2013.01); *G06T 2207/10012* (2013.01); *G06T 2207/30256* (2013.01); *G06T 2207/30261* (2013.01)
(58) Field of Classification Search
  CPC ....... G06K 9/00825; G06T 1/00; G06T 7/593; G06T 7/60; G06T 2207/10012; G06T 2207/30256; G06T 2207/30261; B60Q 9/008
  See application file for complete search history.

(56) References Cited

U.S. PATENT DOCUMENTS

| | | | | |
|---|---|---|---|---|
| 10,501,059 | B2* | 12/2019 | Matsuo | G01S 17/08 |
| 2004/0032971 | A1 | 2/2004 | Nagaoka et al. | |
| 2013/0226432 | A1* | 8/2013 | Tsuruta | B60W 30/0956 |
| | | | | 701/96 |
| 2013/0329019 | A1* | 12/2013 | Matsuoka | H04N 13/218 |
| | | | | 348/49 |
| 2014/0207357 | A1* | 7/2014 | Shimotani | B60K 31/00 |
| | | | | 701/93 |
| 2015/0356358 | A1 | 12/2015 | Okada | |
| 2016/0014387 | A1* | 1/2016 | Baik | H04N 13/398 |
| | | | | 348/51 |
| 2017/0008521 | A1* | 1/2017 | Braunstein | G06K 9/00791 |
| 2017/0300764 | A1* | 10/2017 | Kakegawa | G06T 1/00 |
| 2017/0329000 | A1* | 11/2017 | Masui | G01S 13/867 |
| 2020/0031281 | A1* | 1/2020 | Watanabe | H04N 13/111 |

FOREIGN PATENT DOCUMENTS

| | | | |
|---|---|---|---|
| JP | 2005-62910 A | | 3/2005 |
| JP | 2005331389 A | * | 12/2005 |
| JP | 2008-304202 A | | 12/2008 |
| JP | 2008-309637 A | | 12/2008 |
| JP | 2008304202 A | * | 12/2008 |
| JP | 2008309637 A | * | 12/2008 |
| JP | 2012-2683 A | | 1/2012 |
| JP | 2012-168592 A | | 9/2012 |
| JP | 2013-174494 A | | 9/2013 |
| JP | 2015-230703 A | | 12/2015 |
| JP | 2015230703 A | * | 12/2015 |

OTHER PUBLICATIONS

International Search Report (PCT/ISA/210) issued in PCT Application No. PCT/JP2017/020197 dated Sep. 26, 2017 with English translation (four (4) pages).

Japanese-language Written Opinion (PCT/ISA/237) issued in PCT Application No. PCT/JP2017/020197 dated Sep. 26, 2017 (four (4) pages).

Japanese-language Office Action issued in Japanese Application No. 2016-113995 dated Feb. 18, 2020 with English translation (eight (8) pages).

* cited by examiner

OBJECT DISTANCE DETECTION DEVICE

TECHNICAL FIELD

The present invention relates to an object distance detection device.

BACKGROUND ART

As a background technology in this technical field, PTL 1 proposes a technique of suppressing a decrease in a calculation time and an increase in a circuit scale in distance detection by a stereo camera, for example.

Specifically, PTL 1 describes a technique of narrowing a search range in an upper area than a parallax search range in a lower area on a screen in a case where there are no neighboring objects.

CITATION LIST

Patent Literature

PTL 1: JP 2013-174494 A

SUMMARY OF INVENTION

Technical Problem

In the technology described in PTL 1, a calculation load can be decreased in the case where there is no object to be detected in the lower area on the screen. However, typically, the object to be detected exists in the neighbor and there are many cases where the search range in the upper area on the screen cannot be narrowed, and the calculation load may not be able to be efficiently decreased.

Therefore, the purpose of the present invention is to provide an object distance detection device capable of both improving object detection accuracy and reducing a calculation load.

Solution to Problem

The present invention includes a plurality of imaging units, an object information acquisition unit that obtains object information including distance information of an object, a search condition setting unit that sets a condition for searching, for an image element corresponding to a specific image element inside a standard image captured by one of the plurality of imaging units, inside a reference image captured by another imaging unit, and a stereo distance detection unit that performs the search on the basis of the condition set by the search condition setting unit, and detects a distance of the object on the basis of a parallax obtained by the search, wherein the search condition setting unit sets a search range for the search on the basis of detection information of the object.

Advantageous Effects of Invention

The present invention can provide an imaging device capable of both improving object detection accuracy and reducing a calculation load.

DESCRIPTION OF EMBODIMENTS

Embodiments of the present invention will be described below with reference to the drawings.

Figure 1:
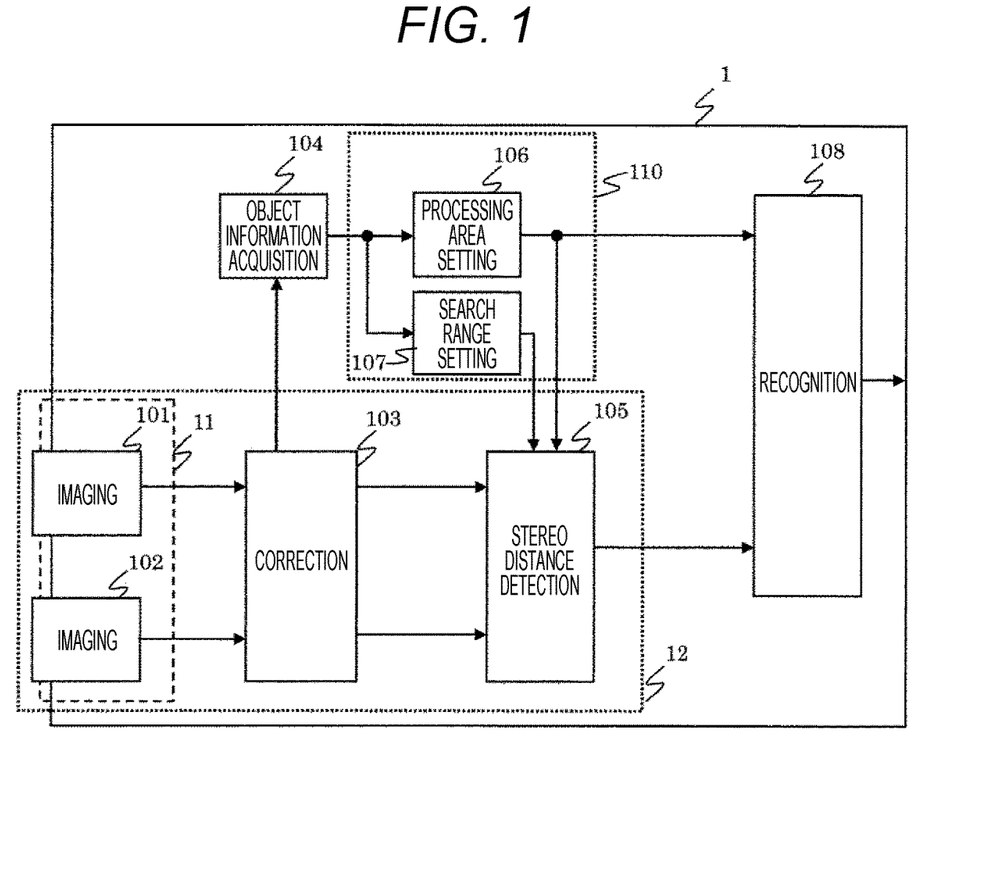
FIG. 1 is a diagram illustrating a configuration of an imaging device in an embodiment of the present invention.

FIG. 1 is a diagram illustrating a configuration of an embodiment of an imaging device of the present invention. An imaging device 1 of the present embodiment is mounted in the front of a vehicle, for example, and constitutes a part of a safety system that recognizes signals, obstacles, and the like to assist a driver.

Imaging units 101 and 102 has an optical lens mounted on an image sensor. These imaging units repeat imaging of one image at predetermined timing and output an imaged image.

The imaging unit 101 and the imaging unit 102 are installed apart from each other in a left and right direction with a predetermined distance and can calculate a distance to an object from a displacement between the images captured by the imaging unit 101 and the imaging unit 102, a so-called parallax.

Note that FIG. 1 illustrates an example in which constituent elements of the imaging device 1 are accommodated in the same housing. However, for example, the imaging units 101 and 102 may be collectively accommodated in a different housing from other constituent elements (the dotted frame 11 in FIG. 1) or may be respectively housed in different housings and attached to the vehicle. In this case, image signals may be connected by connection cables (not illustrated). An example of a method of transmitting an image using a connection cable includes a transmission method using a differential transmission line of a low voltage differential signaling (LVDS) system.

Further, color image sensors are adopted as image sensors of the imaging unit 101 and the imaging unit 102, thereby to acquire color information of the captured images.

An image correction unit 103 takes in the images from the imaging units 101 and 102, performs correction to adjust luminance of the images with a correction value measured in advance, and further corrects distortion of the images by a lens and performs correction to adjust horizontal positions of the images of the imaging units 101 and 102 with a correction value measured in advance. Measurement of the correction values is performed in a process of manufacturing the imaging device. For each device before application of collection values, a specific object is imaged, a luminance correction value of each pixel, which makes the luminance of the acquired images uniform, and a geometric correction value of each pixel, which cancels lens distortion and makes the images positioned horizontal, are obtained, and the correction values are stored in a nonvolatile memory (not illustrated) for each device as correction tables.

An object information acquisition unit 104 acquires object information including distance information of an object. In the present embodiment, the object information acquisition unit 104 detects an object from an image acquired from at least one of the plurality of imaging units, and detects a distance of the object. That is, the object information acquisition unit 104 detects an object by monocular processing and thus can be referred to as a monocular distance detection unit. Further, the object information acquisition unit 104 can be specified as a first distance detection unit from a relationship with a stereo distance detection unit to be described below.

The object information acquisition unit 104 inputs the image of either the imaging unit 101 or the imaging unit 102 and detects a distance to an area of the object. As a method of detecting an object, there is a following method, for example. The object information acquisition unit 104 takes in an image of either the imaging unit 101 or the imaging unit 102 and detects an assumed traffic signal, road sign, or the like, in the taken image. An example of the detection method includes a method of detecting an object such as a traffic signal or a road sign from a similarity amount between luminance distribution or edge shape information in the image and pattern data held as reference data. The object in the image and the position of the object on the screen can be grasped by the method. Furthermore, the object information acquisition unit 104 can roughly detect the distance of the object from the height and size of the detected object on the screen, for example. The object information acquisition unit 104 outputs a detection result to a processing area setting unit 106 and a search range setting unit 107 to be described below.

A stereo distance detection unit 105 is another distance detection unit (that is, a second distance detection unit), and inputs images from the image correction unit 103 and detects a distance of an object. As a method of detecting a distance, there is a following method, for example. The stereo distance detection unit 105 takes in the images from the image correction unit 103, and calculates a parallax. As described above, since the imaging unit 101 and the imaging unit 102 are installed apart from each other in the left and right direction with a predetermined distance, the imaged images have a parallax. So-called stereo processing of calculating the parallax is performed. An example of the parallax calculation method includes a block matching method. The stereo distance detection unit 105 detects the distance of an area of an image specified by the processing area setting unit 106 to be described below, of the images from the image correction selection unit 103, for example. Specifically, first, the stereo distance detection unit 105 searches an area having the same object appear on the image of the imaging unit 102, the area corresponding to a small block area having a predetermined size cut out from a specified image area of the imaging unit 101, by shifting one pixel at a time in a horizontal direction. At that time, the stereo distance detection unit 105 searches a search range of the number of pixels specified by the search range setting unit 107 to be described below, as the search range in the horizontal direction. Then, a difference in position between the matched block areas in the imaging unit 101 and the imaging unit 102 becomes the parallax. The distance in a real environment of the object appearing in the block area can be obtained using this parallax. Note that, in this example, the block area is adopted as an image element of which the distance is to be obtained. As a matching and comparison method, for example, a position at which the sum of differences in luminance of pixels in the block area becomes small is employed as the parallax. Note that it is known that the detected distance can be obtained from lens focal lengths of the imaging unit 101 and the imaging unit 102, the distance between the imaging unit 101 and the imaging unit 102, the above-obtained parallax, and a pixel pitch of the imaging sensors. However, the distance calculation method is not limited to this example. Further, the image element of which the distance is to be obtained is not limited to the above-described block area, and individual pixels constituting the imaging sensors may be adopted.

A search condition setting unit 110 sets a condition for searching, by the stereo distance detection unit 105, for an image element corresponding to a specific image element in a standard image captured by one of the plurality of imaging units, a reference image captured by another imaging unit. Specifically, the search condition setting unit 110 includes the processing area setting unit 106 and the search range setting unit 107.

The processing area setting unit 106 specifies an area of an image of which the distance is to be detected by the stereo distance detection unit 105 to be described below and specifies a position of an image of which an object is to be recognized by a recognition unit 108 to be described below on the basis of the result of the object information acquisition unit 104.

The search range setting unit 107 sets a search range for detecting a distance by the stereo distance detection unit 105 on the basis of the result of the object information acquisition unit 104.

The stereo distance detection unit 105 detects the distance of the specified area of the image from the correction unit 103 as described above and outputs a result to the recognition unit 108 to be described below. By the processing, limitation of the area of the distance detection by the distance stereo distance detection unit 105 and the search range becomes possible, and the increase in the processing load can be avoided.

The recognition unit 108 receives the detection result from the stereo distance detection unit 105 and the area specification from the processing area setting unit 106, recognizes the object on the image, and outputs information of a recognition result to the outside of the imaging device 1. The recognition unit 108 recognizes the object on the basis of the distance information obtained by the stereo distance detection unit 105, of the area specified by the processing area setting unit 106. As a method of recognizing an object, in a case where pieces of distance information indicating nearly the same distance exist in the vicinity, for example, the pieces of distance information are made into one group and is recognized as the object when the size of the group has a fixed value or more. Then, the recognition unit 108 detects that the object is a vehicle or a pedestrian, for example, on the basis of the size and shape of the detected group. There is a method of detecting the size and shape of the object from comparison with pattern data held as reference data in advance. According to this processing method, the distance from a user's own vehicle to an object in front such as a pedestrian or a vehicle can be obtained with high accuracy. Therefore, the obtained distance is used as information for avoiding a collision, such as for deceleration and stop of the user's own vehicle.

Note that, in the imaging device 1, the imaging units 101 and 102, the image correction unit 103, and the stereo distance detection unit 105 in the dotted frame 12 are constituted by an electronic circuit, and the other constituent elements are realized by software processing by a microcomputer (not illustrated), for example.

Figure 2:
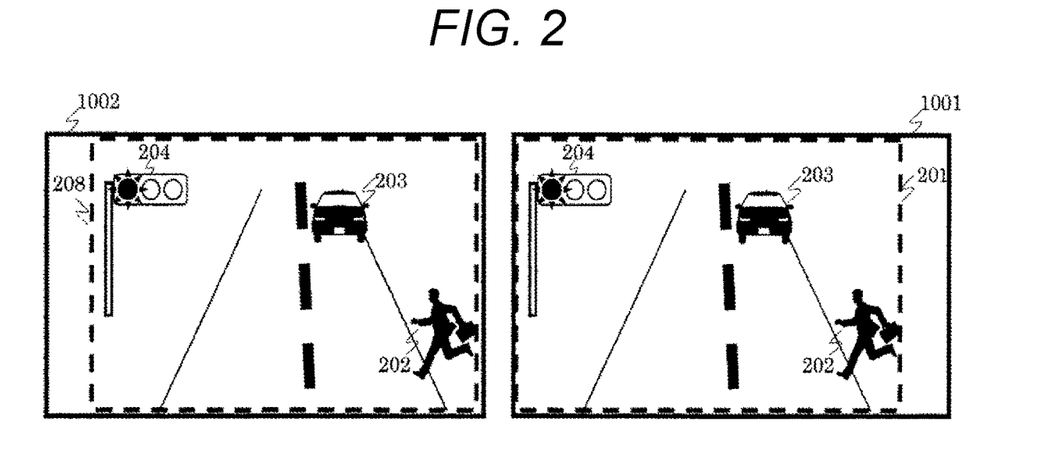
FIG. 2 is a diagram illustrating an example of an imaged image imaged in an embodiment of the present invention.

FIG. 2 is a diagram illustrating an example of imaged image imaged in an embodiment of the imaging device of the present invention. FIG. 2 illustrates an imaged image 1001 imaged by the imaging unit 101 and corrected by the correction unit 103, and an imaged image 1002 imaged by the imaging unit 102 and corrected by the correction unit 103. FIG. 2 illustrates objects 202, 203, and 204.

Further, FIG. 2 illustrates commonly imaged areas 201 and 208 that are commonly imaged areas of the imaged image 1001 and the imaged image 1002. As described above, there is a displacement of the commonly imaged area between the imaged image 1001 and the imaged image 1002, and the distance of the object is calculated by the displacement amount, that is, the parallax.

Figure 3:
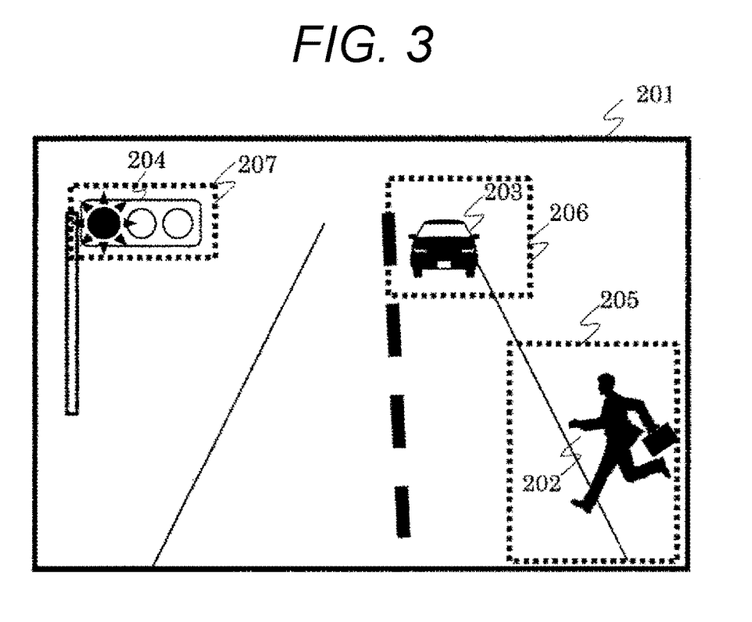
FIG. 3 is a diagram illustrating an example of an imaged image imaged in an embodiment of the present invention and area control.

FIG. 3 is a diagram illustrating an example of an imaged image imaged in an embodiment of the imaging device of the present invention and area control. An area 201 in FIG. 3 indicates an area of the imaged image imaged by the imaging unit 101 and corrected by the correction unit 103, the area 201 having been commonly imaged with the image imaged by the imaging unit 102 as described above, for example.

Processing areas 205, 206, and 207 are processing areas specified by the processing area setting unit 106, of the imaged image 201, and are processing areas for which the distance detection processing is performed by the stereo distance detection unit 105. That is, the processing areas 205, 206, and 207 are partial areas of the common imaging area, which are specified by the processing area setting unit 106 from results of detection of a pedestrian 202, an oncoming vehicle 203, and a traffic signal 204 and of rough distance detection processing of the detected objects by the object information acquisition unit 104. In each of these areas, the distance of the image element in the partial area is calculated on the basis of the parallax between the plurality of captured images by the stereo distance detection unit 105.

Figure 4:
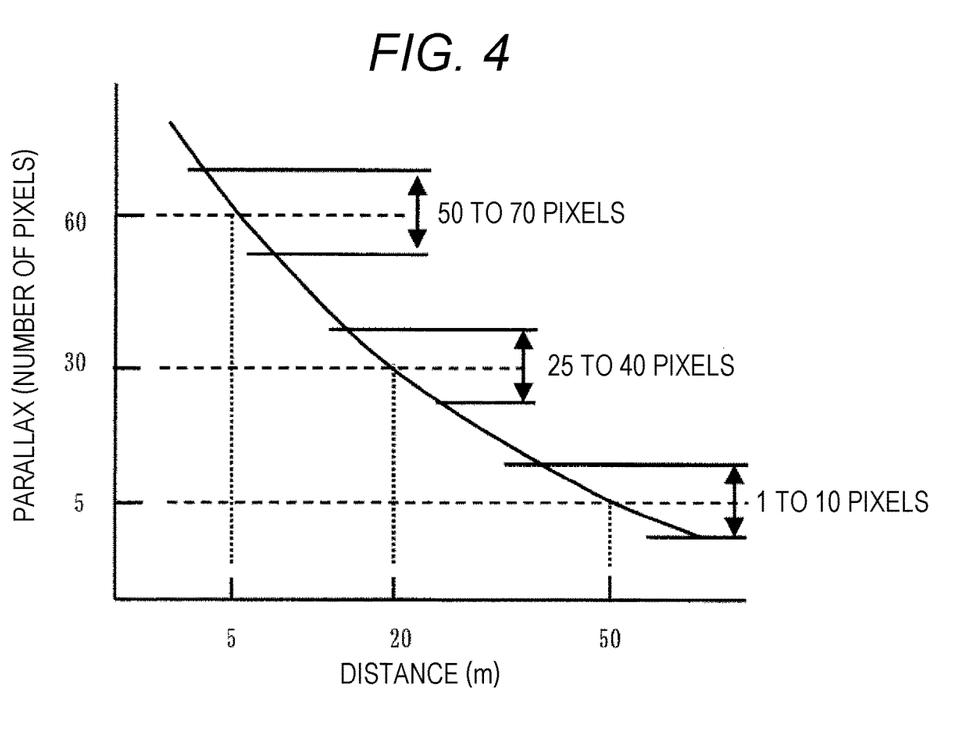
FIG. 4 is a diagram illustrating an example of a method of specifying a search range specified in an embodiment of the present invention.

FIG. 4 is a diagram illustrating a relationship between the distance and the parallax of an embodiment of the imaging device of the present invention, and an example of a method of setting the search range by the search range setting unit 107. The parallax is expressed by a unit of pixels, and indicates the displacement amount of the image captured by the imaging unit 102 from the image captured by the imaging unit 101. For example, in the case where the distance of the pedestrian 202 is detected as about 5 m by the object information acquisition unit 104, the parallax in this case is 60 pixels from FIG. 4. Therefore, the search range setting unit 107 sets a range from 50 to 70 pixels around the 60 pixels to the processing area 205 as the search range of the distance of the pedestrian 202. Similarly, in the case where the distances of about 20 m and about 50 m are respectively detected for the processing areas 207 and 206 that are the areas of the traffic signal 204 and the oncoming vehicle 203, the search range setting unit 107 sets a range from 25 to 40 pixel and a range from 1 to 10 pixels as the search ranges, respectively. With the setting, the range of the limited number of pixels around the distance detected by the object information acquisition unit 104 is simply searched in each processing area for the parallax, and the processing load is reduced. Further, in the case where the distance cannot be detected in the set search range, the set search range is expanded and the search processing for the expanded range is performed, whereby the processing load can be minimized. For example, a case in which a character on a roadside poster is erroneously detected as a person, and the object information acquisition unit 104 detects a distance that is different from an actual distance is expected.

Figure 5:
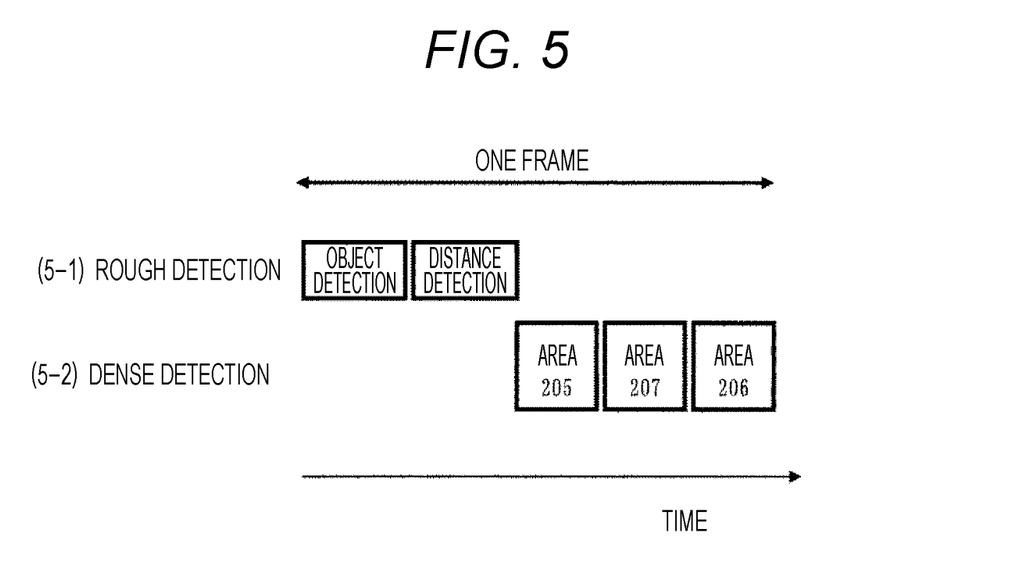
FIG. 5 is a diagram illustrating processing timing of an imaging device in an embodiment of the present invention.

FIG. 5 is a diagram illustrating processing timing of an embodiment of the imaging device of the present invention. In FIG. 5, (5-1) illustrates processing timing of the object information acquisition unit 104 and (5-2) illustrates processing timing of the stereo distance detection unit 105.

In (5-1), the object detection and rough distance detection processing for the object are performed for the imaged image 201 by the object information acquisition unit 104 as described above. Further, in (5-2), the distance detection is performed by the stereo distance detection unit 105, for the search range of each processing area specified by the search range setting unit 107, for each of the processing areas 205, 206, and 207 specified by the processing area setting unit 106. As the order of processing, an area including an object close to the user's own vehicle is processed first, whereby early recognition by the subsequent recognition unit 108 becomes possible and safety can be secured.

In this manner, the distance detection processing by the stereo distance detection unit 105 is performed for only the specified necessary processing area in the minimum search range necessary in the processing area. Therefore, distance search of the entire range is not necessary for all the areas of the imaged image, and the processing load can be decreased.

Figure 6:
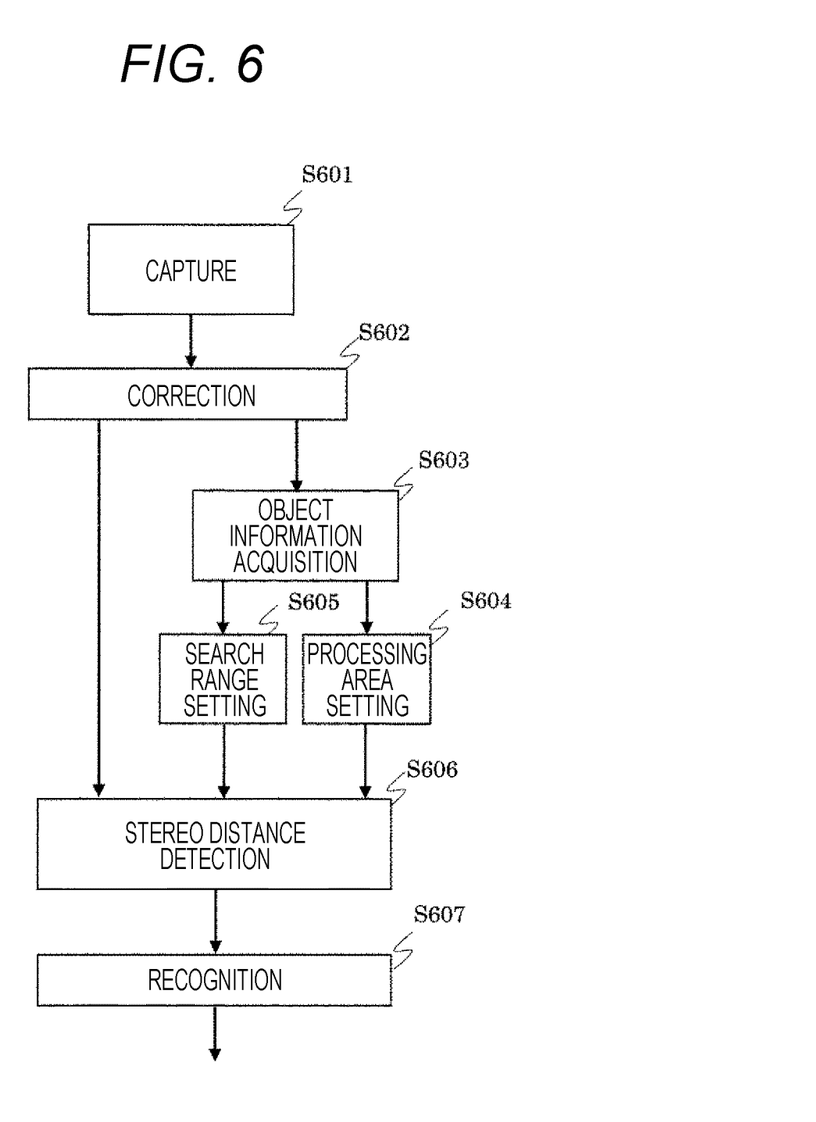
FIG. 6 is a diagram illustrating a processing flow of an imaging device according to an embodiment of the present invention.

FIG. 6 is a diagram illustrating a processing flow of an embodiment of the imaging device of the present invention. First, images are captured by the imaging units 101 and 102 (S601: S represents a step). The image correction unit 103 performs the luminance correction, lens distortion correction, and horizontal alignment for the captured images (S602). Next, the object information acquisition unit 104 detects the object and its approximate distance (S603). Among the detection results, the processing area setting unit 106 outputs area information to be processed from position information of the detected object to the stereo distance detection unit 105 (S604), and the search range setting unit 107 determines the search range to be searched in the area including the object from the distance information of the detected object and outputs the search range to the stereo distance detection unit 105 (S605).

Next, the stereo distance detection unit 105 detects a detailed distance in the search range in each specified area on the basis of the obtained detection result (S406).

Finally, the recognition unit 108 performs object recognition processing on the basis of the distance detection result of the object in each processing area, and outputs the recognition result (S607). These processes are repeated, for example, every frame.

Figure 7:
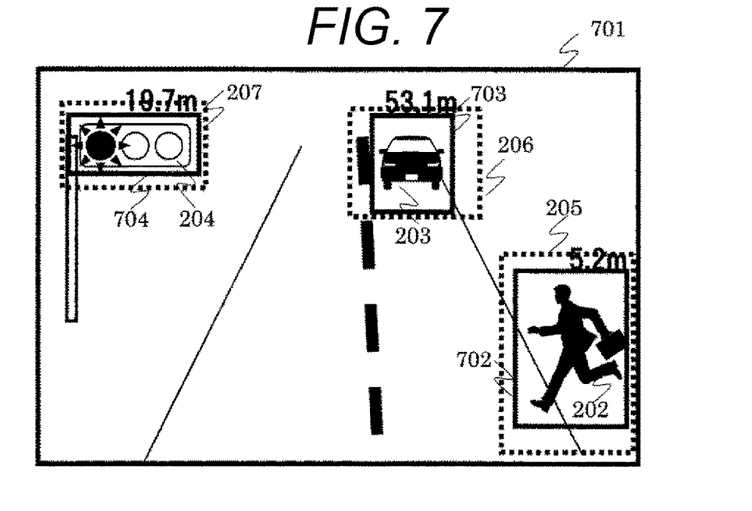
FIG. 7 is a diagram illustrating an example of a captured image and a recognition result in an embodiment of the present invention.

FIG. 7 is a diagram illustrating an example of a captured image and a recognition result in an embodiment of the imaging device of the present invention. An image 701 is imaged by the imaging unit 101 at a certain point of time, and the imaging unit 102 also captures and acquires a substantially similar image. Further, recognition results 702, 703, and 704 are recognition results of objects. The frames and distance display in the image are not imaged images and are explicitly superimposed on the image.

The pedestrian 202 detected from the processing area 205 being positioned at a distance 5.2 m, the oncoming vehicle 203 detected from the processing area 206 being positioned at a distance 53.1 m, and the traffic signal 204 detected from the processing area 207 being positioned at a distance 19.7 m are illustrated. As described above, the object distance detection with high accuracy can be realized over the entire captured image.

According to the present embodiment, the object and the distance of the object are roughly detected from the captured image, and the accurate distance detection processing is performed for the area including the object on the basis of the detection result, limiting the search range of the distance. Therefore, the object recognition of the entire imaged image becomes possible without the increase in the processing load.

Figure 8:
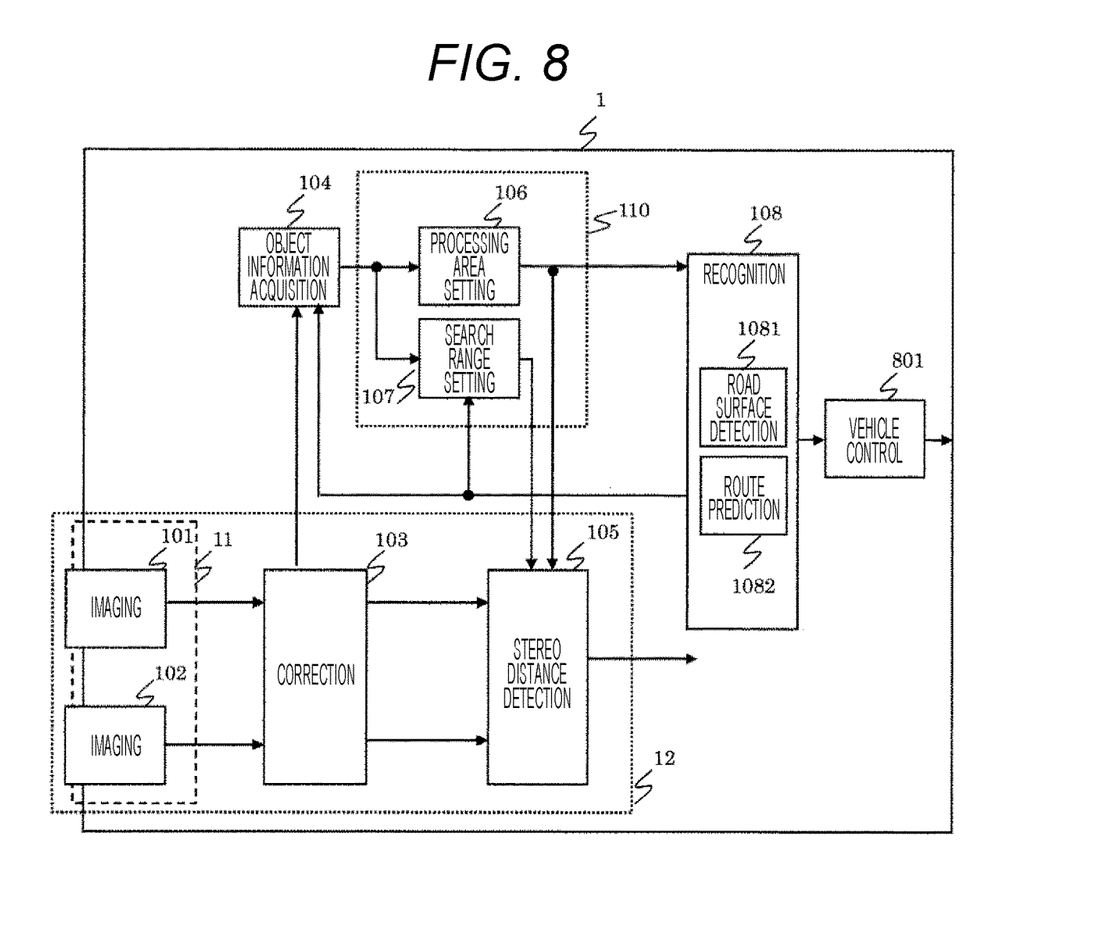
FIG. 8 is a diagram illustrating another example of area control in an embodiment of the present invention.

FIG. 8 is a diagram illustrating a configuration of another embodiment of an imaging device of the present invention. An imaging device 1 is mounted on a vehicle such as an automobile, and a vehicle control unit 801 is illustrated in FIG. 8. An output of a recognition unit 108 is input to the vehicle control unit 801. Further, the recognition unit 108 includes a road surface detection unit 1081 that separates a road surface portion from other objects and detects the road surface portion as a road surface area from distance information in a captured image, and outputs the area to an object information acquisition unit 104. The recognition unit 108 further includes a travel route prediction unit 1082 that inputs vehicle information such as a vehicle speed and a steering angle although not illustrated and predicts a travel route of a user's own vehicle, and outputs the travel route to the object information acquisition unit 104.

The object information acquisition unit 104 inputs the road surface information detected by the road surface detection unit 1081 and preferentially processes an object on the road surface, and a processing area setting unit 106, a search range setting unit 107, and a stereo distance detection unit 105 detect an accurate distance, and the recognition unit 108 performs recognition, whereby an obstacle of the user's own vehicle can be promptly recognized and safe traveling can be maintained. Further, the object information acquisition unit 104 preferentially processes an object on the road surface to travel from the travel route prediction unit 1082 and recognizes an obstacle on the travel route of the user's own vehicle, as described above, to realize the safe traveling.

Further, the search range setting unit 107 inputs a vehicle speed of the user's own vehicle, and sets a wider search range in the case of a fast speed and sets a narrower search range in the case of a slow speed, thereby to enable reliable distance detection processing with a minimum necessary processing amount.

Figure 9:
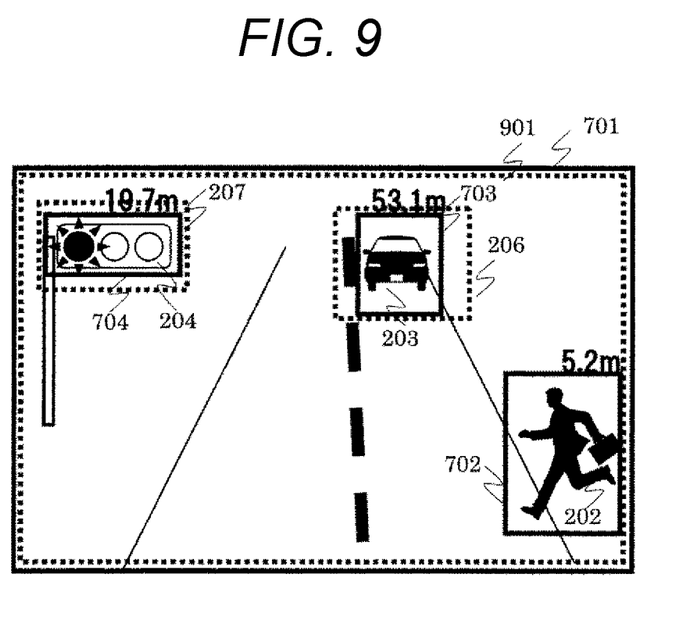
FIG. 9 is a diagram illustrating an example of a captured image and a recognition result in an embodiment of the present invention.

Further, as illustrated in FIG. 9, the processing area setting unit 106 sets a processing area 901 that is an entire image as a processing area, for example, and at that time, a search control unit sets a range from 50 to 70 pixels around 60 pixels as a search range, as described above, and a near distance such as 2 m to 10 m of the user's own vehicle is detected, whereby an entire screen can be searched for distance, for the vicinity of the user's own vehicle, and safety can be enhanced.

Further, the object information acquisition unit 104 collectively processes a plurality of adjacent objects, the processing area setting unit 106 sets the plurality of objects as one area, and the search range setting unit 107 sets the search range that includes distances of the objects within the one area collectively detected by the object information acquisition unit 104, whereby the case of a plurality of objects can be handled.

The vehicle control unit 801 in FIG. 8 receives a recognition result by the recognition unit 108, and controls devices (not illustrated) of the vehicle. The control of the vehicle includes lighting of a warning lamp to a driver due to detection of approach of a pedestrian, a red light signal, or a road sign, generation of a warning sound, deceleration and stop control by braking, throttle and brake control at the time of following a vehicle ahead, steering angle control for collision avoidance and lane keeping, and the like. These pieces of vehicle control information is output from the imaging device 1 to other devices (not illustrated) via an in-vehicle network.

Note that FIG. 8 illustrates the example in which the vehicle control unit 801 is accommodated in the same housing as the imaging device 1. However, an embodiment is not limited to the example, and imaging units 101 and 102 may be accommodated in a separate housing, as described above.

Figure 10:
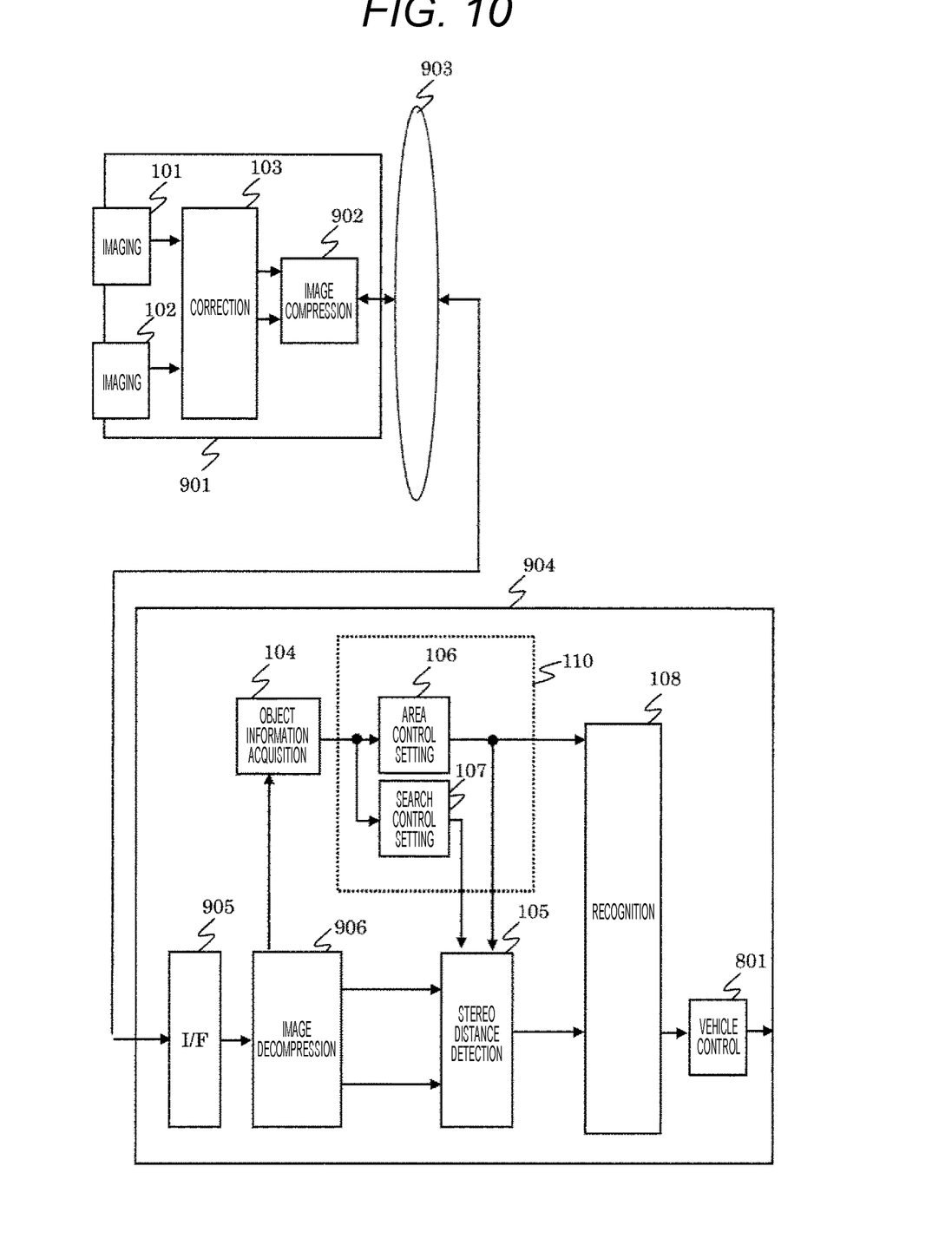
FIG. 10 is a diagram illustrating a configuration of an imaging device in another embodiment of the present invention.

FIG. 10 is a diagram illustrating a configuration of still another embodiment of an imaging device of the present invention. FIG. 10 illustrates a network imaging unit 901, a local area network (LAN) 903, and a control unit 904. The network imaging unit 901 is connected with the control unit 904 via the LAN 903. Further, FIG. 10 illustrates an image compression/interface unit 902, a network interface unit 905, and an image decompression unit 906.

Images captured by an imaging unit 101 and an imaging unit 102 undergo luminance correction, lens distortion correction, and horizontal alignment by an image correction unit 103. Next, the image compression/interface unit 902 compresses the images from the image correction unit 103 and transmits the images to the LAN 903. An example of an image compression method includes a method using an in-screen compression method of performing compression in one image without using temporal correlation of a plurality of images to reduce a processing time. Alternatively, a video compression coding method may be selected and the image compression method may be switched.

The image compression/interface unit 902 generates compression coded data and transmits the data according to a predetermined network protocol. Note that achievement of high efficiency and high image quality is expected by having the processing of the image correction unit 103 at a front stage of the image compression/interface unit 902, such as performing compression after correction of lens distortion. However, the image correction unit 103 may be provided at a subsequent stage of the image decompression unit 906 of the control unit 904.

In the control unit 904, the network interface unit 905 receives the compressed image data via the LAN 903. The compressed image data received by the network interface unit 905 of the control unit 904 is decompressed into the original image by the image decompression unit 906, and the above-described processing is performed by a processing area setting unit 106 and a search range setting unit 107 for an object detected by an object information acquisition unit 104. Subsequent processing is as described above.

According to the present embodiment, since the image and imaging timing information are exchanged via the LAN 906, the processing amount on the imaging unit side can be reduced, and dimensional restrictions for vehicle installation can be decreased by weight reduction, low power consumption, and downsizing of the housing on the imaging unit side.

Figure 11:
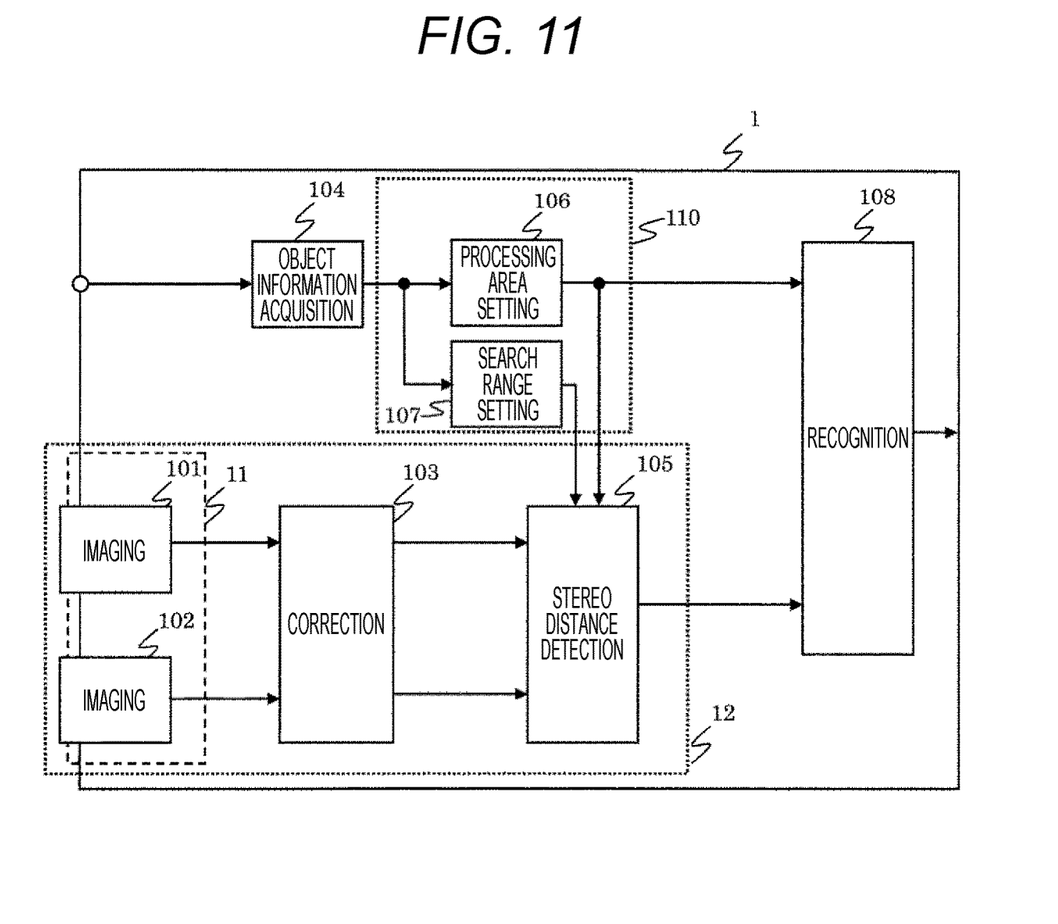
FIG. 11 is a diagram illustrating a configuration of an imaging device in still another embodiment of the present invention.

FIG. 11 is a diagram illustrating a configuration of another embodiment of the present invention. In the present embodiment, input information of an object information acquisition unit 104 is obtained from a sensor capable of obtaining distance information other than imaging units 101 and 102. An example of the input information includes information obtained from the sensor such as a radar or an infrared sensor (not illustrated), and a distance of an object in a target range can be obtained. Subsequent operations are as described above.

Note that the present invention is not limited to the above-described embodiments and includes various modifications.

For example, the above embodiments have been described in detail for easy understanding of the present invention, and the present invention is not necessarily limited to one including all the described configurations. Further, a part of the configuration of a certain embodiment can be replaced with the configuration of another embodiment. Further, the configuration of another embodiment can be added to the configuration of a certain embodiment. Further, another configuration can be added to/deleted from/replaced with a part of the configurations of the embodiments.

Further, each of the above-described configurations may be realized such that a part or the whole of the configuration is configured by hardware or by execution of a program by a processor. Further, control lines and information lines necessary for description are illustrated, and all the control lines and the information lines necessary for a product are not necessarily illustrated. Almost all the configurations are connected with one another for implementation.

REFERENCE SIGNS LIST 1 imaging device
101 to 102 imaging unit
103 image correction unit
104 object information acquisition unit
105 stereo distance detection unit
106 processing area setting unit
107 search range setting unit
108 recognition unit
201 common imaging area
202 to 204 object
205 to 207 processing area
702 to 704 recognition result
801 vehicle control unit
901 network imaging unit
902 image compression/interface unit
903 LAN
904 control unit
905 network interface unit
906 image decompression unit

The invention claimed is:

1. An object distance detection device comprising:
a plurality of imaging units;
an object information acquisition unit that is configured to, i) acquire object information including distance information of an object, and ii) detect the object from an image acquires from one of the plurality of imaging units, iii) detect a distance to the object;
a search condition setting unit that is configured to set a condition for searching, for an image element corresponding to a specific image element inside a standard image captured by one of the plurality of imaging units, inside a reference image captured by an imagine unit other than the unit that captured the specific image element inside a standard image, wherein
the condition for searching includes both a search range and a processing area, and
the search condition setting unit includes;
a processing area setting unit is configured to set, within the reference image, the processing area including the object obtained by the object information acquisition unit, and
a search range setting unit that is configured to set the range for the search on the basis of the distance information of the object included in the objection information detected by the object information acquisition unit, and
a stereo distance detection unit that is configured to: i) perform the search on the basis of the condition for searching set by the search condition setting unit, and to ii) detect a detailed distance of the object on the basis of a parallax obtained by the search.

2. The object distance detection device according to claim 1, wherein
the search range setting unit changes and sets the search range according to the distance information acquired by the object information acquisition unit.

3. The object distance detection device according to claim 1, further comprising:
a road surface detection unit that is configured to detect a road surface based on distance information, wherein
the object information acquisition unit is configured to acquire a distance of an object on the road surface detected by the road surface detection unit.

4. The object distance detection device according to claim 1, further comprising:
a travel route prediction unit that is configured to predict a travel route, wherein
the object information acquisition unit is configured to acquire a distance of an object on the route predicted by the travel route prediction unit.

5. The object distance detection device according to claim 1, wherein
the search condition setting unit includes;
a search range setting unit that is configured to change and set the search range according to a vehicle speed.

6. The object distance detection device according to claim 1, wherein
the search range setting unit is configured to set a search range corresponding to a near distance as the search range, and
the processing area setting unit is configured to set an entire image area as the processing area.

7. The object distance detection device according to claim 1, wherein
the processing area setting unit is configured to set a processing area including a plurality of objects obtained by the object information acquisition unit, and
the search range setting unit is configured to set the search range on the basis of distances of the plurality of objects detected by the object information acquisition unit.

8. The object distance detection device according to claim 1, wherein
the search range setting unit expands the search range in a case where the distance of the object is not able to be detected by the stereo distance detection unit, and the stereo distance detection unit detects detailed a distance for the expanded search range.

\* \* \* \* \*